United States Patent [19]

Fahey

[11] 4,268,577

[45] May 19, 1981

[54] ELASTOMERIC COATING COMPOSITION FOR GLASS FIBERS AND COATED GLASS FIBERS MADE FROM SAME

[75] Inventor: Dennis M. Fahey, Lexington, N.C.

[73] Assignee: PPG Industries, Inc., Pittsburgh, Pa.

[21] Appl. No.: 70,595

[22] Filed: Aug. 29, 1979

Related U.S. Application Data

[62] Division of Ser. No. 974,580, Dec. 29, 1978.

[51] Int. Cl.$^3$ .................... B05D 3/02; B32B 27/00; D02G 3/00
[52] U.S. Cl. ................. 428/394; 260/29.7 GP; 427/389.8
[58] Field of Search .............. 260/29.4 VA, 29.6 NR, 260/29.7 H, 29.7 R, 33.6 AQ, 31.8 DR, 29.76 P; 428/378, 406, 394; 427/390 A, 389.8

[56] References Cited

U.S. PATENT DOCUMENTS

| | | | |
|---|---|---|---|
| 3,434,994 | 3/1969 | Smit et al. | 260/29.7 |
| 3,479,313 | 11/1969 | Kreider | 260/29.7 |
| 3,827,230 | 8/1974 | Marzocchi et al. | 260/29.4 X |
| 3,864,195 | 2/1975 | Patterson | 260/29.2 TN |

*Primary Examiner*—Michael R. Lusignan
*Attorney, Agent, or Firm*—Kenneth J. Stachel

[57] ABSTRACT

An elastomeric coating composition for glass fibers is provided that gives the glass fibers improved weaveability. The coating contains an elastomeric latex, an external plasticizer that is soluble, dispersible or emulsifiable in the elastomeric latex; an antioxidant; and an elastomeric curing agent. Also the coating composition can contain melamine aldehyde polymer, emulsifier, wetting agents, surfactants, synthetic waxes, stabilizers, lubricants, solubilizing agents and anti-foaming agents.

20 Claims, No Drawings

ELASTOMERIC COATING COMPOSITION FOR GLASS FIBERS AND COATED GLASS FIBERS MADE FROM SAME

This is a division of application Ser. No. 974,580, filed Dec. 29, 1978.

BACKGROUND OF THE INVENTION

The present invention is related to treated glass fibers and, more particularly, to an elastomeric coating composition for treating glass fibers that yields coated glass fibers having improved weaveability. Glass fibers constitute continuous glass fibers as well as strands, yarns, cords, and fabrics formed thereof. Glass fibers have been used in various ways in woven products, such as, those in the carpet industry.

The use of glass fiber strand in woven products requires that the glass fibers have a soft protective coating to protect the glass fibers in the strand from interfilament abrasion and to provide characteristics such as lack of brittleness needed in the production of the woven product. The coated glass fiber strand must have sufficient weaveability to allow its use in woven products.

Weaveability is a characteristic that glass fiber strand must have to undergo satisfactorily the weaving process, where the strand is wound around a cop inside a shuttle of a weaving loom. The process involves transporting the shuttle, or the strand itself in a shuttleless loom, back and forth across the loom so the strand unravels from the cop to supply the weft in between the warp strands running perpendicular to the weft strands. As the strand unravels, it is coiled to some degree due to its previously wound condition. The coiled strand is vulnerable to breakage from the force applied to it in being transported across the loom. To avoid breakage from this force the strand should have a good knot tensile strength. The knot tensile strength as measured by American Society of Testing Materials (ASTM) Standard D-2256 measures the tensile strength of the strand when folded over itself in a knot. Generally glass fiber strand composed of glass fibers having small diameters have better weaveability than strands composed of coarser glass fibers. The problem with this is that strands composed of fine glass fibers are more expensive to produce.

Coated glass fiber strand composed of glass fibers having a large diameters and possessing good weaveability would be useful in many woven products. For example in the past the fill material for woven carpets that is used as the weft to lock in the pile and other components was composed of jute fibers. Jute fibers made good carpet fill material, since the fibers are quite strong and reasonably stable. Recently the availability of jute has become a problem. This coupled with the recognized problem of lack of uniformity of jute fibers has led to the replacement of jute with glass fibers as carpet fill material. The glass fibers used to replace the jute have been in the form of waste tire cord or glass fiber strand composed of small diameter glass fibers. Coated glass fiber strand is an excellent replacement for jute in carpet fill material because of the uniformity, dimensional and heat stability and strength of the glass fiber present therein. The replacement of jute by glass fiber strand requires a coated glass fiber strand with good weaveability and one that is not too tacky. This is obtained when the glass fibers in the strand have a small diameter, i.e. G-fiber diameter or smaller. In "The Manufacturing Technology of Continuous Glass Fibers," K. L. Lowenstein, Elsevir Scientific Publishing Company, New York, 1973 at page 26, there is an explanation of the filament diameter and strand designation by letter, which is hereby incorporated by reference. The economic penalty incurred in using strands with small diameter glass fibers must be tolerated, since strands with glass fibers of larger diameters lack good weaveability to make a good carpet fill material or other woven products. Waste tire cord is not readily used in producing woven products because the cord is too tacky and involves additional process steps to reduce the tackiness.

Also, it is well known in the art that plasticizers or softeners can be used in a material to increase the material's susceptibility to plastic flow, flexibility, workability, and distensibility. But it is also well known in the art, that the incorporation of a plasticizer into a material decreases the strength of the material and in some cases when plasticizers are added to materials render them tacky.

It is an object of the present invention to provide coated, coarser, glass fibers that possess sufficient strength, stability and lack of brittleness, and adequate knot tensile strength characteristics without being too tacky to produce coated glass fiber strands with improved weaveability.

It is an additional object of the present invention to provide a coating composition to coat glass fibers to increase the glass fibers strength, stability, lack of brittleness, and weaveability and knot tensile strength without an adverse increase in tackiness to permit the glass fibers to be produced in coarser, more economic filaments that are made into strands for use in woven products.

SUMMARY OF THE INVENTION

In accordance with my invention, the aforementioned objects are achieved because of the unexpected discovery that the incorporation of an external type of plasticizer into a coating for glass fibers wherein the coating contain an elastomer produces a coating that, when applied to glass fibers that are gathered into strands, yields coated glass fiber strand having good strength, stability, and lack of brittleness and excellent knot tensile strength characteristics without having an adverse quantity of tackiness, thus giving the coated glass fiber strands improved weaveability.

The coating composition of my invention comprises: an elastomeric latex containing an external plasticizer compatible with the latex, but one that is not an internal plasticizer, so it does not become a part of the polymer chain of the elastomer, an antioxidant, and a curing agent.

The antioxidant and curing agent may be any compound known to those skilled in the art to be used with an elastomeric latex. Also the external plasticizer may be any plasticizer known to those skilled in the art that is compatible with the elastomeric latex and can be emulsified with the latex in amounts as large as around one-half the amount of the elastomeric latex in the composition but does not become an integral part of the polymer chain of the elastomer. The plasticizer may be self-emulsifying or may be emulsifiable by emulsion agents. The amounts of the antioxidant and the addition of curing agents that are used are those that make the material effective for its intended purpose, i.e. retard oxidation and curing the mixture of the elastomeric latex, plasticizer and melamine aldehyde polymer.

A melamine aldehyde polymer can be used to control the tackiness of the coating on the glass fiber strands. The amount of melamine aldehyde polymer used will depend on the inherent tackiness of the elastomeric latex. If the latex is not too tacky the quantity of melamine aldehyde polymer that is added may be reduced. In addition other known additives for elastomeric latex coatings can be used and non-limiting examples including fillers, accelerators waxes, emulsifiers, wetting agents, stabilizing agents, lubricants, solubilizing agents and anti-foaming agents.

The percent solids of the composition varies widely depending on how much of a coating is to be added to the glass fibers. The amount of coating to be added is that which gives the glass fibers an improved weaveability without imparing the strength, toughness, or knot tensile strength of the glass fibers. The improved weaveability of the glass fibers coated with the coating composition of the present invention is determined by the American Society of Testing Materials (ASTM) standard test for knot tensile strength referred to as D-2256.

DETAILED DESCRIPTION OF THE INVENTION

The elastomer used in the elastomeric coating of the present invention can be any elastic substance such as natural rubber latex from the Hevea tree and/or synthetic rubber and rubberlike materials. This also includes natural and synthetic rubber and rubberlike materials which have been chemically modified such as by chlorination to improve the physical properties. Synthetic rubber includes rubberlike materials such as chloroprene, butadiene, isoprene and copolymers thereof with acrylonitrile styrene, and isobutylene. The elastomer may be natural or synthetic rubber in the uncured or unvulcanized state. Non-exclusive examples of the elastomer include butadiene-styrene copolymer latices such as Dylex 1204 and/or 553 synthetic rubber latices including the Dylex polystyrene emulsion manufactured by ARCO Polymers, Inc. or carboxylated butadiene-styrene latex such as that marketed by Goodyear under the trademark Pliolite 480, or the chlorinated rubber such as neoprene latices sold commercially by DuPont. Also hot polymerized (200 Series) styrene-butadiene latices, cold polymerized (2100 Series) styrene-butadiene latices, reclaimed rubber dispersions, butyl rubber dispersions and ethylene-propylene-butadiene terpolymer rubber dispersions can be used. Vinyl pyridine styrene butadiene terpolymers latices could be used, but their adhesive qualities are not needed in the coating composition thereby making their use uneconomic.

Other latices include natural rubber latex which may be the crude rubber latex, or the latex which contains added material, or which can be treated to alter the character of the rubber, for example, by degradation and/or oxidation. The latex may contain any desired accelerator, vulcanizer, stabilizer, dispersing agents or any other substance such as are commonly used in the rubber industry. When rubber is used as an artificial dispersion of either natural or any known synthetic rubber, it may also contain additional substances as rubber accelerators vulcanizers, stabilizers, dispersing agents and the like. Besides the specified rubber or elastomeric latices and dispersions, any combination of the above is hereby disclosed for the purposes of this invention. In addition a less conductive type of elastomeric latex, such as the Dylex 1204 or 553 latices, may be substituted for a portion of the elastomeric latex. This portion may be as great as one-half the amount of the elastomeric latex. This less conductive elastomeric latex would benefit the process of coating the glass fibers where a dielectric heater is employed to remove moisture from the coated strand. The benefit achieved is a decreasing in the chance of arcing in the dielectric heater. The amount of elastomer used is generally in the range of about 30 to about 70 weight percent on a dry basis of the coating. If less than about 30 weight percent of the elastomeric latex is used the coating will not give the required protection to the glass fiber strand to prevent or maintain at a minimum the interfiber abrasion of the glass fibers constituting the strand. If more than about 70 weight percent of the elastomeric latex is used the user will not obtain any additional benefits and such use would be uneconomic.

Since oxidation plays a role in changes that accompany extended aging of uncompounded elastomeric latices, an antioxidant is added to the elastomeric latex. Nonexclusive examples of antioxidants that can be used in the present invention include: diarylamine type antioxidants or stabilizers; 2,2,4-trimethyl-1,2-dihydroquinoline and polymer (Age Rite D); 6-ethoxy-2,2,4-trimethyl-1,2-dihydroquinoline and polymer (Santoflex AW); 6-phenyl-2,2,4-trimethyl-1,2-dihydroquinoline and polymer (Santoflex B); p-benzyloxyphenol (Age Rite Alba); di-tert-butyl-p-cresol (Ionol); 2,2'-methylenebis (4-methyl-6-tert-butylphenol) (Antioxidant 2246); p,p'-diaminodiphenylmethane (Tonox); and styrenephenol reaction products such as Wingstay L or Bostex 294, the latter which is available from Akron Dispersions, Akron, Ohio. The amounts of the antioxidant used are generally in the range of about 0.5 to about 2.0 weight percent on a dry basis of the coating. The specific amount depends on the specific antioxidant used but an amount in the stated range will be effective in retarding oxidation or stabilizing the elastomeric latex.

The external plasticizer that is used in the coating of the present invention to give coated glass fibers the weaveability characteristics without detracting from the toughness of the glass fibers are those plasticizers that are water soluble, dispersible or emulsifiable in or with the elastomeric latex without being incorporated into the polymer chain of the elastomer. The external plasticizer acts to weaken intermolecular bonding of the elastomer by a solvating action to increase the softness and flexibility of the elastomer in contrast to an internal plasticizer that achieves a similar effect by copolymerization. These plasticizers can be self-emulsifiable or emulsifiable by the addition of an emulsifier. Generally the plasticizer can be one of the petroleum hydrocarbon processing oils such as Circo processing oil, available from Sun Oil Co., Philadelphia, PA; Bearflex LPO oil, available from Golden Bear Oil Co., Bakersfield, California and Gascon 1200 light petroleum oil, available from ARCO Chemical Co., Philadelphia, PA, other aromatic, napthenic and paraffinic oils can also be used. Another type of plasticizer that can be used is the ester plasticizers such as dioctyl phthalate, dibutyl sebocate and triethylene glycol di[2-ethylhexoate]). Another type of plasticizer that may be used is a sulfonated oil like Plastogen plasticizing agent available from R. T. Vanderbilt Co., Inc. The amount of plasticizer used in the coating of the present invention is generally in the range of about 10 to about 50 percent on a dry solids (non-aqueous components) basis of the coating. If less than this amount of plasticizer is used, the beneficial results will not be achieved because the coating will be too hard and inflexible. If an amount greater than an amount in this range is used, the resulting coating will not give the coated glass fibers sufficient toughness or knot tensile strength necessary in producing woven products.

The elastomeric latex can also be extended with fillers to make a suitable coating for glass fibers. Non-limiting examples of fillers that may be used include: clay, calcium carbonate, hydrated alumina, colloidal silica dispersions such as Ludox ® dispersions, titanium dioxide, diatomaceous earth, silica, flour, mica, lighin, starches, or dextrin like Nadex 771 available from National Starch and Chemical Corp. New Jersey. The amount of filler used is that amount needed to give the coating formulation a good viscosity for coating glass fibers. The amount is generally in the range from 0 weight percent to about 15 weight percent on dry basis of the coating.

The melamine aldehyde polymer that can be added to the coating formulation of the present invention is added as a detackifier. The aldehyde used to make the melamine aldehyde polymer is formaldehyde or a formaldehyde donor. Examples of aldehyde include: formaldehyde, paraldehyde, butyraldehyde, isobutyraldehyde, propionaldehyde, acetaldehyde and the like and formaldehyde donors like paraformaldehyde and hexamethylenetetramine. An example of a melamine aldehyde polymer useful in the coating composition of the present invention is a melamine-formaldehye resin like Resimene melamine resin available from Monsanto Co. or a hexamethoxymethylolmelamine such as Cyrez 963 resin available from American Cyanamide Co., New Jersey. The amount of melaminealdehyde condensate added to the coating composition is generally in the range of 0 if the latex is not too tacky to about 5.0 weight percent of the coating on a dry basis.

In addition to the aforementioned ingredients used in the coating, the coating also contains an elastomeric curing agent and preferably an elastomeric latex accelerator. The curing agent can be any sulfur or sulfur donor known to those skilled in the art, for example a sulfur dispersion available from R. T. Vanderbilt Co., Connecticut. To increase the rate of cure, an accelerator can be added to the coating formulation. The accelerator can be mercaptothiazole or derivative, like dispersed mercaptobenzothiazole available from Testworth Laboratories, Inc., Indiana under the product name Paracure AC-50; or dithiocarbamates and bis (thiocarbamyl) sulfides, guanidines and aldehyde-amine reaction products, xanthates, thioureas and mercaptothiazolines. The amounts of the curing agent and acceleraator used are those amounts that would be used by those skilled in the art of elastomeric latices. Generally the amount of curing agent ranges from about 0.3 to about 2.5 weight percent of the coating on a dry basis. Also the general amount of an accelerator is in the range of 0 to about 1.5 weight percent of the coating on a dry basis.

In addition to the aforementioned ingredients for the coating composition of the present invention, additives such as emulsifiers, wetting agents, surfactants, synthetic wax, stabilizers, lubricants, solubilizing agents and antifoams may be added to the coating composition.

When a wax is added, such as, microcrystalline paraffin wax emulsion available as Mobilicer Q wax from Mobil Corporation, New York, the quantity of plasticizer in the coating can be reduced but not totally replaced. The amount of wax used is in the range of 0 to about 35 weight percent on a dry basis of the coating.

When additional emulsifiers are used, such as Tween 21 and/or Tween 85 emulsifiers, ethylene oxide derivatives of sorbitol ester, the amount used is generally in the range of about 1 to about 16 weight percent on a dry basis of the coating. Other non-limiting examples of suitable emulsifiers include fatty acid sulfonates, polyglycol esters of fatty acids, polyhydric alcohol esters of high molecular weight mineral organic acids, fatty acid alkylol amines, ethoxylated sorbitan monostearate and sorbitan monooleate and acid esters of polyethylene glycol.

Also a wetting agent can be used such as Igepal CA-630 wetting agent, octyl phenoxy poly(ethyleneoxy) ethanol, the amount is generally in the range of 0 to about 3 weight percent of the coating on a dry solids basis. Also an amount of zinc oxide in the range of 0 to about 1.5 weight percent of the coating on a dry basis can be added to the coating composition. Also a silicon defoamer, like SAG 470 available from Union Carbide Corporation, can be added to the coating composition in an amount in the range of 0 to about 0.25 weight percent on a dry basis of the coating. Also stabilizing agents like ammonia, triethanolamine and the like basic compounds and compounds like glycerine can be added to the coating composition. The amount of stabilizing agent or agents is in the range of 0 to about 4 weight percent of the coating on a dry solids basis.

The elastomeric coating is applied to sized or unsized continuous strands of glass fibers by a conventional means for applying such a coating, such as by immersion of the strands of glass fibers into a bath of the elastomeric coating composition, or by contacting the strand with the coating on an applicator roll. Also the coating may be applied to the glass fiber like a size directly after forming from a bushing and before the fibers are gathered into strands. The amount of coating to be added to the glass fiber should be in the range of about 8% DPU (dip pickup) to about 20% DPU to obtain improved weaveability for the glass fiber as measured by an increase in the knot tensile strength as measured according to ASTM testing procedure D-2256. An amount less than 8% DPU will produce a coated glass fiber strand with an unsatisfactory knot tensile strength, and an amount greater than 20% DPU could be used but such a use would lead to waste and would be uneconomic. After the elastomeric coating has been applied to the glass fibers, the coated glass fibers are dried and cured by any means known to those skilled in the art.

In the preferred embodiment of the present invention the coated glass fibers are dried by dielectric heating as discussed in U.S. Pat. No. 3,619,252 (Roscher). In order to avoid undesired arcing in the dielectric heater, it is preferred to lower the conductivity of the elastomeric coating composition so that the arcing will not be induced as the coated glass fibers pass between the electrodes of the dielectric heater. Also it is preferred to coat strands of glass fibers having a diameter of "K" and having 1,000 filaments per strand. This size of strand is a medium thickness strand which is not usually used in woven fabrics because of its poor flexibility and knot tensile strength giving unsatisfactory weaveability.

Also, it is preferred that the glass fiber be twisted after the coating is applied.

In the elastomeric coating of the preferred embodiment the latex is a butadiene styrene latex such as Dylex 1204 or around 50:50 mixture of Dylex 1204 and Gen Flo latex, the latter available from General Tire and Rubber Co. wherein the amount of the latex is about 30 to around 70 weight percent of the coating on a dry basis. Also in the coating the antioxidant such as Bostex 294 is present in an amount in the range of around 0.05 to about 2.0 weight percent on a dry basis. The plasticizer, such as the nonionic plasticizer, Gascon 1200 processing oil, which has a boiling point greater than 700° F. (371° C.) and a viscosity around 1200 SUS 100° F., (38° C.) and a specific gravity of 0.93 is present in an amount in the range of about 10 to about 50 weight percent on a dry basis. Also present in the elastomeric coating of the preferred embodiment are nonionic emulsifiers like Tween 21 and Tween 85, polyoxyethylene sorbitan monolaurate and trioleate respectively available from ICI United States, Inc., Georgia, in an amount of about 2 to about 10 weight percent for the former and about 1 to about 6 weight percent for the latter, all on a dry basis of the coating. Also present in the preferred coating composition is a filler like Nadex 771 dextrin in an amount in the range of about 0.1 to about 15 weight percent on a dry solids basis. The preferred coating composition also has a melamine-formaldehyde polymer such as Resimene melamine aldehyde resin in an amount in the range of about 0.1 to about 5.0 weight percent on a dry basis. Also present in the preferred coating composition is a 68 percent sulfur dispersion in an amount of about 0.3 to about 2.5 weight percent on a dry basis; and Paracure AC-50 dispersed mercapto-benzothiozole accelerator is present in an amount in the range of about 0.01 to about 1.5 weight percent on a dry basis of the coating. It is preferred that the Gascon 1200 is added to the butadiene styrene latex as an emulsion prepared with the emulsifiers, Tween 21 and 85. The percent solids of the final elastomeric coating is preferably in the range of about 15 percent to about 30 percent.

This elastomeric coating is then applied to the glass fiber strands, preferably the preferred K-15 1/0 glass fiber strand, by contacting the strands with the coating composition on a series of conventional applicator rolls. These rolls dip into the coating and carry the coating to the strands, which then pass over a wiper roll to remove excess coating. The traveling speed of the glass fiber strands (if a dipping technique is employed), the tension under which the glass fiber strand is held and other factors can be adjusted such that the pick up of the coating composition is in the range of about 8 to about 20 percent by weight of the glass fiber strand after dipping (DPU). Then the coated glass fiber strands are dried in a dielectric heater, and then advanced through a conventional hot gas oven maintained at a temperature of about 300° to 500° F. (149° to 260° C.) to effect curing of the coating and then removed from the oven and collected as elastomeric coated glass fiber strands for use in carpet manufacturing and manufacturing of woven products.

To further illustrate the invention of this application, reference should be made to the following non-limiting examples:

EXAMPLE I

A twenty-five (25) percent solids coating composition weighing 4,200 grams was prepared. A butadiene-styrene latex having a solids content of 50% marketed by ARCO Polymers, Inc. under the trademark of Dylex 553 in an amount of 1200 grams was mixed with 18 grams of Bostex 294 antioxidant dispersion.

Then Gascon 1200 petroleum oil, available from ARCO Chemical Co. under the name Gascon and the name Tufflo in an amount of 240 grams was mixed with 30 grams of Tween 21, available from ICI United States and 18 grams of Emsorb 6903 available from Emery Industries followed by 800 grams of slowly added hot water at a temperature of 60° to 80° C. to produce an oil emulsion admixture. To this emulsion admixture, there was added 1,000 grams of cool water at a temperature of 20° to 30° C.

The emulsion of Gascon 1200 oil was added to the butadiene styrene latex-antioxidant admixture. Then to these materials there was mixed the following ingredients: 736 grams of water and 80 grams of Nadex 771 corn dextrin filler, 65 grams of Resimene 841 (65% solids) melamineformaldehyde resin; 8 grams of 68% sulfur dispersion; and 6 grams of Paracure AC-50 accelerator.

This coating composition showed excellent stability and shelf-life with no separation and remained a liquid for over a week.

EXAMPLE II

A twenty-five (25) percent solids coating formulation was prepared in a 15 gallon (56.8 liters) batch. A butadiene-styrene latex having a solids content of 50%, (Dylex 553) in an amount of 35.9 lb. (162.8 kg) and Bostex 294 (50% solids) and 35 lbs. (158.7 kg) of water were charged to a conventional coating mixing vessel. In a container suitable for emulsification processing, there was charged the following: Gascon 1200 processing oil in an amount of 7.2 lb. (32.7 kg) and 407 grams of Tween 21 and 244 grams of Tween 85 emulsifiers. Using an efficient mixing unit for emulsification, such an Eppenbach mixer, 10 lbs. (37.9 liters) of hot water (60°-80° C.) were slowly added to the container while the material was mixed. The emulsion was then added and rinsed into the Dylex latex and Bostex antioxidant mixture.

In another vessel 31 lbs. (140.6 kg) of water were charged and 2.4 lb.s (10.9 kg) of Nadex 771 filler were added and dispersed. Then the following components were charged to the filler in water mixture: 882 grams of Resimene 841 (65% solids) melamine formaldehyde resin (65% solids) 109 grams of 68% sulfur dispersion, and 81.5 grams of Paracure AC-50 (50% solids) accelerator. This mixture was added with good stirring to the main mixing vessel containing the latex with antioxidant and emulsion to produce the coating composition of the present invention.

This coating was applied to glass fiber strands having a filament diameter of 0.00050 inches (K diameter) with 1,000 filaments per strand. The K-15 1/0 glass fiber strands were produced in a conventional process and contained a conventional size. The coating was applied in a process similar to coating glass fibers with RFL coatings as discussed in U.S. Pat. No. 3,619,252 (Roscher). The coated yarn was dried in a dielectric heater. This coated glass fiber yarn was then tested according to ASTM Test Procedure D-2256 for knot tensile strength. The knot tensile strength was 11 lbs. (48.9 newtons) at 12% DPU (dip pick up), which is an exceptional knot tensile for K-15¹/0 strand that usually has a knot tensile of around 27 newtons at 20% DPU.

EXAMPLE III

A coating with 22% solids having 305 gal. (1,154 liters) of water was prepared from the following formulation:

| Component | Weight lbs/kg | Solids lbs/kg | Dry Basis Weight % |
|---|---|---|---|
| Dylex D1204 (styrene butadiene latex) | 940/4,263 | 470/2,132 | 57% |
| Cyrez 963 (hexamethoxymethyl melamine) | 14/63.5 | 14/63.5 | 1.6% |
| Igepal CA-630 (octyl phenoxy poly-[ethyleneoxy] ethanol wetting agent) | 14/63.5 | 14/63.5 | 1.6% |
| Bostex 294 (50%) antioxidant | 14/63.5 | 7/31.8 | .8% |
| Gascon 1200 oil (plasticizer) | 188/853 | 188/853 | 23% |
| Tween 21 (emulsifier) | 24/109 | 24/109 | 2.9% |
| Tween 85 (emulsifier) | 14/63.5 | 14/63.5 | 1.6% |
| Nadex 771 (filler) | 64/290 | 64/290 | 8% |
| 68% Sulfur Dispersion (curing agnet) | 7/31.8 | 4.9/22 | .6% |
| Puracure AC50 50% (accelerator) | 5/22.7 | 2.5/11.3 | .3% |
| 60% Zinc Oxide Dispersion | 5/22.7 | 3/13.6 | .4% |
| Mobilcer Q wax (50%) | 50/227 | 25/113.4 | 3% |
| SAG 470 (deformer) | 25/1.1 | .25/1.1 | — |
| Triethanaloamine | 10/45.4 | 10/45.4 | 1.1% |
| Glycerine | 10/45.4 | 10/45.4 | 1.1% |

This coating was prepared in a similar manner as in Example II and was applied to K-15 1/0 glass fiber strands as in Example II.

The foregoing described a coating composition that gives elastomerically coated glass fiber strands with improved weaveability without seriously affecting the toughness of the glass fibers and without having too much tackiness to adversely affect weaving. Such a coating composition gives the coated glass fiber strand an excellent knot tensile strength. The coating composition of the present invention when applied to the glass fibers permits the use of larger diameter glass fibers for weaving applications such as for carpet fill material but it is to be understood the coating of the present invention can be applied to smaller diameter glass fibers to give these glass fibers better knot tensile strength and better weaveability.

I claim:

1. Glass fiber strand coated with the dried residue of an elastomeric coating composition for glass fibers to yield coated glass fiber strands of medium thickness having improved weaveability by having an increased knot tensile strength, wherein the aqueous elastomeric coating composition, comprises:
   (a) an elastomeric latex in an amount in the range of about 30 to about 70 weight percent on a dry solids basis of the composition,
   (b) an external plasticizer soluble, dispersible or emulsifiable into the latex but not incorporable into the polymer backbone of the elastomer in an amount in the range of about 10 to about 50 weight percent on a dry solids basis of the composition,
   (c) an antioxidant for elastomeric latices in an amount in the range of about 0.05 to about 2 weight percent on a dry solids basis of the coating composition,
   (d) an elastomeric latex curing agent in an amount in the range of about 0.3 to about 2.5 weight percent on a dry solids basis of the coating composition,
   (e) water in an amount sufficient to obtain a percent solids of the coating composition to allow for coating the glass fiber strand.

2. Coated glass fiber strand according to claim 1 wherein the strand has an amount of the aqueous elastomeric coating in the range of about 8 to about 20 weight percent pickup.

3. Coated glass fiber strand according to claim 1 wherein the elastomer is selected from the group consisting of butadiene-styrene latices and carboxylated derivatives thereof and neoprene and mixtures thereof.

4. Coated glass fiber strand according to claim 3 wherein a portion of butadiene-styrene latex is replaced with a less conductive butadiene-styrene latex.

5. Coated glass fiber strand according to claim 1 wherein one or more emulsifiers are added to the composition to emulsify the plasticizer.

6. Coated glass fiber strand according to claim 5 wherein the emulsifiers are non-ionic emulsifiers selected from the group consisting of ethylene oxide derivatives of sorbitol esters.

7. The coated glass fiber strand according to claim 1 wherein the antioxidant is a polymeric hindered phenol.

8. Coated glass fiber strand according to claim 1 wherein the filler is added in an amount in the range of about 0.1 to about 15 weight percent on a dry solids basis of the coating.

9. Coated glass fiber strand according to claim 8 wherein the filler is dextrin.

10. Coated glass fiber strand according to claim 1 wherein a melamine formaldehyde polymer is added to the coating in an amount in the range of about 0.1 to about 5.0 weight percent of the coating.

11. Coated glass fiber strand according to claim 10 wherein the melamine aldehyde polymer is a melamine formaldehyde polymer.

12. Coated glass fiber strand according to claim 11 wherein the melamine aldehyde polymer is a hexamethoxymethylolmelamine.

13. Coated glass fiber strand according to claim 1 wherein the curing agent is sulfur dispersion.

14. Coated glass fiber strand according to claim 1 wherein an elastomeric latex accelerator is in an amount in the range of about 0.01 to about 1.5 weight percent of the coating on a dry solids basis.

15. Coated glass fiber strand according to claim 14 wherein the accelerator is mercaptobenzothiozole.

16. Glass fiber strand coated with the dried residue of an elastomeric coating composition for glass fibers to yield coated glass fiber strands of medium thickness having improved weaveability by having increased knot tensile strength, wherein the aqueous elastomeric coating composition, comprises:
   (a) a butadiene-styrene latex in the range of about 30 to about 70 weight percent of the coating composition on a dry solids basis,
   (b) a light petroleum oil plasticizer emulsion in an amount in the range of about 10 to about 66 weight percent of the coating composition on a dry solids basis and comprising:
(1) a light petroleum oil external plasticizer in an amount in the range of about 10 to about 50 weight percent on a dry solids basis of the coating composition, and
(2) one or more emulsifying agents of the group consisting of polyoxyethylene sorbitan monolaurate and polyoxyethylene sorbitan trioleate and mixtures thereof in an amount of about 1 to about 16 weight percent on a dry solids basis of the coating composition,
(c) a polymeric hindered phenol antioxidant in an amount in the range of about 0.05 to about 2 weight percent of the coating on a dry solids basis,
(d) a filler in an amount in the range of about 0.1 to about 1.5 weight percent of the coating composition on a dry solids basis,
(e) melamine formaldehyde resin in an amount in the range of about 0.1 to about 5.0 weight percent of the coating on a dry solids basis,
(f) a sulfur dispersion in an amount in the range of about 0.3 to about 2.5 weight percent of the coating composition on a dry solids basis,
(g) mercaptobenzothiozole in an amount in a range of about 0.01 to about 1.5 weight percent of the coating composition on a dry solids basis, and
(h) water in sufficient amounts to bring the percent solids of the coating composition in the range of about 10 percent to about 40 weight percent.

17. Coated glass fiber strand according to claim 16 wherein the strand has an amount of the aqueous elastomeric coating in the range of about 8 to about 20 weight percent pickup.

18. The coated glass fiber strand according to claim 1 or 16 wherein the strand is comprised of glass fibers produced by drawing glass filaments from molten cones of glass at a high rate of speed, applying to the filaments during formation an aqueous glass fiber size composition having a film former, and a lubricant, and gathering the filaments into a strand and winding the strand up on a rapidly rotating forming tube and unwinding the strand from the forming tube to be coated with the elastomeric coating composition wherein the filaments have a diameter of around $5.25 \pm 0.25 \times 10^{-4}$ inches.

19. An article of manufacture for use in producing woven carpets that can be used as the weft between which the carpet pile is woven comprising:
(a) coated glass fiber strand produced by drawing glass filament from molten cones of glass at a high rate of speed, applying to the filaments during formation an aqueous glass fiber size composition having a film-former, a lubricant, and gathering the filaments into a strand and winding the strand up on a rapidly rotating forming tube and unwinding the strand from the forming tube to be coated with an elastomeric composition, comprising
(1) an elastomeric latex in an amount of about 30 to about 70 weight percent on a dry solids basis of the composition,
(b) an external plasticizer, soluble, dispersible or emulsifiable into the latex but not incorporatable into the polymer backbone of the elastomer in an amount in the range of about 10 to about 50 weight percent on a dry solids basis of the composition,
(c) an antioxidant for elastomeric latices in an amount in the range of about 0.05 to about 2 weight percent on a dry solids basis of the coating composition,
(d) an elastomeric latex curing agent in an amount in the range of about 0.3 to about 2.5 weight percent of the coating composition, and
(e) water in an amount sufficient to obtain a percent solids on the coating composition to allow for the coating of glass fibers and drying to obtain the dried residue of the elastomeric coating composition.

20. The article of claim 19 wherein the glass filaments have a diameter of around $5.25 \pm 0.25 \times 10^{-4}$ inches.

* * * * *